United States Patent [19]
Hansen et al.

[11] 3,924,094
[45] Dec. 2, 1975

[54] WELDING CONTROL ARRANGEMENT WITH ORBITAL TORCH-MOUNTED TRANSDUCING ASSEMBLY

[75] Inventors: Howard A. Hansen, Mossville, both of Ill.; Clyde E. Fulton, deceased, late of Tazewell, Ill.; by Minnie L. Fulton, heir, Tazewell, Ill.; by Brenda G. McCann, heir, Boise, Idaho

[73] Assignees: John W. Crayton, Washington; Caterpillar Tractor Co., Peoria, Ill.

[22] Filed: Nov. 15, 1973

[21] Appl. No.: 415,939

[52] U.S. Cl. ......... 219/125 PL; 219/131 F; 318/578
[51] Int. Cl.² ............................................. B23K 9/10
[58] Field of Search .......... 219/124, 125 R, 125 PL, 219/131 F; 318/576, 578

[56] References Cited
UNITED STATES PATENTS

| | | |
|---|---|---|
| 2,189,399 | 2/1940 | Lewbers .............................. 219/124 |
| 3,171,012 | 2/1965 | Morehead ........................... 219/124 |
| 3,530,273 | 9/1970 | Bollinger et al. ............... 318/576 X |
| 3,594,540 | 7/1971 | Weinfurt ....................... 219/125 PL |
| 3,596,048 | 7/1971 | Maeda et al. ................. 219/125 PL |
| 3,612,818 | 10/1970 | Bechtle et al. ................... 219/131 F |

FOREIGN PATENTS OR APPLICATIONS

| | | | |
|---|---|---|---|
| 221,872 | 9/1968 | U.S.S.R. .............................. 219/124 |

*Primary Examiner*—J. V. Truhe
*Assistant Examiner*—Clifford C. Shaw
*Attorney, Agent, or Firm*—Phillips, Moore, Weissenberger, Lempio & Strabala

[57] ABSTRACT

An apparatus for controlling deposition of metal from a consumable electrode in a weld groove employs electromechanical sensors which provide information to the apparatus controls. This information includes vertical height of the weld torch above the workpiece, direction in which the weld groove extends, and the cross-sectional area of the weld groove. Such signals are effective to condition the welder controls to position the welding torch accurately in the X, Y and Z directions, and further, to regulate torch travel speed and/or electrode feed rate. This permits accurate deposition of weld material in a groove which may change direction horizontally and/or vertically, and further assures proper fill height in a groove that may vary considerably in cross-section.

7 Claims, 8 Drawing Figures

Fig_5A_

Fig_5B_

Fig_5C_

Fig_6_

WELDING CONTROL ARRANGEMENT WITH ORBITAL TORCH-MOUNTED TRANSDUCING ASSEMBLY

BACKGROUND OF THE INVENTION

This invention relates to welding apparatus, and more particularly, to a welding apparatus in which sensing means maintain proper positioning of a welding head with relation to a seam to be welded.

Welding of large irregularly shaped workpieces requiring relatively long welds is a significant part of many manufacturing processes, particularly those associated with the production of large earthmoving machines. Many welding operations involve a "semiautomatic" process where a torch is manually held, positioned and guided, with the wire feed and shielding gas thereof being regulated in accordance with preset controls at the power supply and gas source. Where conditions permit, higher welding productivity can be achieved in a process involving a "machine welder." In this process, the machine welder is provided suitable power supply and controls to permit the machine to provide the torch positioning effort, with an operator manipulating the controls to guide the machine. In such case, torch travel, speed and/or wire feed rate are maintained at some level determined by suitable control settings. Shielding gas is regulated in accordance with a predetermined setting at the gas controls.

Machine welders which incorporate some form of sensing means which in turn act to position the welding heads thereof are disclosed in U.S. Pat. No. 3,171,012 to Morehead, U.S. Pat. No. 3,568,029 to Bollinger, and U.S. Pat. No. 3,612,818 to Bechtle. While each of these machines is relatively effective in the use for which it is designed, it will be noted that certain limitations exist in each system. For example, in U.S. Pat. No. 3,171,012, it is to be noted that the workpiece must be rotated in the use of the machine. In some situations, particularly where the workpiece is of large and irregular shape, and/or the seam to be welded is of irregular shape, such rotation of the workpiece may be extremely difficult or impossible. In U.S. Pat. No. 3,568,029, a cam and follower must be included to provide a degree of welding head motion, and such cam shape must be arrived at through a study of the shape of the seam to be welded. That is, the system of U.S. Pat. No. 3,568,029 does not lend itself easily and readily to adaptation for use in welding a variety of seam configurations. And, in U.S. Pat. No. 3,612,818, it is to be noted that the welding system thereof is adapted only for use in welding a straight groove, the lever thereof having a member which rides in such groove to pivot the lever upwardly and downwardly in response to changes in the welding groove.

Thus, none of these prior art systems disclose a machine which may be used with held workpiece means, such workpiece means having an irregular seam or groove to be welded, and which depends solely on sensing means associated with the workpiece means to position the welding means in relation to the groove to be welded as the sensing means are moved along and follow such groove.

SUMMARY OF THE INVENTION

It is an object of this invention to provide a welding apparatus which include sensing means for following a groove to be welded and positioning welding means in relation thereto, wherein the welding groove may be of irregular shape, and may vary in the X, Y and Z directions.

It is a further object of this invention to provide a welding apparatus which, while fulfilling the above object, is capable of such proper welding without the use of cam means being used to position the weld head in one of the necessary directions.

It is a still further object of this invention to provide a welding apparatus which, while fulfilling the above objects, utilizes such sensing means to assure proper fill height of weld material in the welding groove, even though the groove may vary considerably in cross-section.

It is a still further object of this invention to provide a welding apparatus which, while fulfilling the above objects, utilizes sensing means which are positioned close to the welding means, but are of such particular design and structure that they are able to properly resist deterioration or weld spatter build-up.

It is a still further object of this invention to provide a welding apparatus which, while fulfilling the above objects, includes sensing means which are capable of positioning the welding means in relation to the shape of the cross-section of the groove so that weld material is properly placed in such groove.

It is a still further object of this invention to provide a welding apparatus which, while fulfilling the above objects, is relatively simple in design and effective in use.

Broadly stated, the invention comprises apparatus for welding a fixed workpiece means along a groove defined thereby. Such apparatus comprises a mounting body movable along any variable path, and welding means connected to the mounting body and generally movable therewith. Sensing means are associated with the mounting body and are generally movable therewith. The sensing means have a portion extending into and in contact with a portion of the groove, and the welding means are positioned adjacent the sensing means and the groove. Means are included for providing movement of the mounting body in any direction to enable the mounting body to be moved thereby along said any variable path. The sensing means, upon actuation of the means for providing movement of the mounting body, move generally along and follow the groove. Further included are means operatively connecting the sensing means and means for providing movement of the mounting body so that the welding means are moved generally along the groove in response to the movement of the sensing means along the groove, to deposit weld material in the groove in a continuous manner. The apparatus further comprises means associated with the sensing means for sensing the width of the groove as the sensing means follows the groove, and means operatively connecting the means associated with the sensing means and the welding means for increasing and decreasing the amount of weld material deposited in the groove, in proportion to the sensed increase and decrease in width of the groove.

BRIEF DESCRIPTION OF THE DRAWINGS

These and other objects of the invention will become apparent from a study of the following specification and drawings, in which.

DESCRIPTION OF THE PREFERRED EMBODIMENTS

Figure 1:
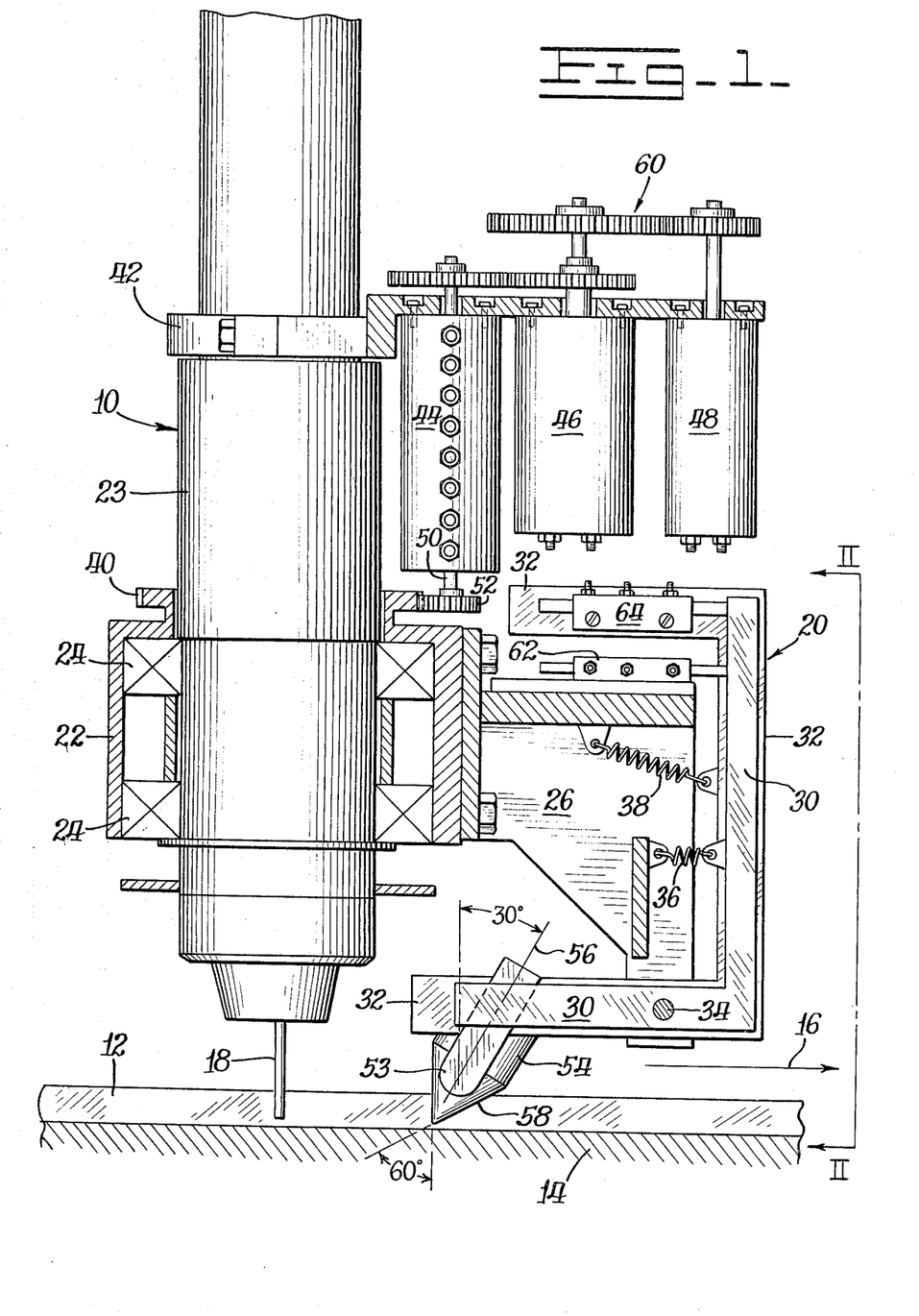
FIG. 1 is a partially sectioned view of the welding apparatus in accordance with the present invention.

An important part of the subject control arrangement is a particular arrangement of sensing members and transducers in the form of potentiometers as shown in FIG. 1. In this view a conventional welding torch 10 is shown in position over a weld seam or groove 12 defined by workpiece means 14. The general direction of travel of the torch 10 is indicated by arrow 16.

In conventional machine welders, controls are provided to permit an operator to position the torch in the X and Y directions relative to the workpiece means 14 and further to position the torch end vertically (Z direction). With the controls set to advance electrode 18 at a constant rate, the operator can manipulate the controls to keep the electrode 18 centered in groove 12 and vary torch travel speed generally in the direction of arrow 16 to accurately deposit weld material in the groove 12 to a proper height. Alternately he can maintain a constant torch travel rate and vary the feed rate of electrode 18 to achieve the same result. Either of these modes of operation requires full time attention of a skilled operator, especially if groove 12 follows a random path and is of non-uniform section.

To automate the operation of a machine welder, an orbital transducing assembly 20 is provided, the turning axis of which is coincident with the axis of electrode 18. The transducing assembly 20 includes a generally cylindrical housing 22 rotatably mounted on the mounting body 23 of torch 10 by bearings 24. Further, a supporting member 26 is bolted to a flat surface on housing 22, and is pivotable relative to the mounting body 23 about the longitudinal axis of the electrode 18. A generally L-shaped lever arm 30 and a U-shaped lever arm 32 are pivotally supported in side-by-side relationship in the lower part of support member 26 by a shaft 34, so as to be pivotal about a common axis transverse of the pivoting axis of the support member 26. The levers 30, 32 are normally biased by springs 36, 38 respectively, each spring being anchored at one end to support member 26.

The upper portion of cylindrical housing 22 is provided with a toothed flange or gear 40 which serves two purposes as will be seen in the following description. A fixed mounting bracket 42 is attached to the mounting body 23 of torch 10 above the orbital transducing assembly 20, and supports a sine-cosine potentiometer 44, an electrically operated clutch 46 and a positioning motor 48. Sine-cosine potentiometer 44 has a common wiper shaft 50 with a gear 52 at its lower end in mesh with the flange gear 40 which is integral with housing 22.

Lever 32 has a sensing member 54 secured in the end of its lower leg portion and positioned adjacent electrode 18. The sensing member 54 is a hardened metallic plug which is capable of living in close proximity to a welding arc without deterioration or susceptability to weld spatter buildup. Specifically, sensing member 54 is made up of a tungsten carbide body which is coated with titanium nitride, which further allows improved wear resistance. The axis 56 of the sensing member 54 is tilted 30° from vertical in the direction of travel 16 to enhance tracking characteristics. The sensing member 54 includes an extended portion which has a 60° conical surface 58 inwardly tapered in the direction of the groove 12, such conical surface 58 having tapered surfaces in continuous contact with the side edges of the groove 12.

In preparing for a welding operation, the operator manipulates the controls to position electrode 18 above a groove 12 to be welded. He then operates the controls to energize clutch 46 and motor 48, causing assembly 20 to be rotated by a gear train 60, potentiometer shaft 50, gears 52, 40, thereby positioning sensing member 54 above groove 12 ahead of electrode 18. Thereafter, clutch 46 and motor 48 are deenergized. At this point, the controls will lower the torch 10 to the desired proximity to the workpiece means 14, because an error signal will be presented from a proximity transducer to be discussed in the later description. This action engages the sensing member 54 in the groove 12.

During the welding operation, sensing member 54 precedes electrode 18 along the groove 12. Any deviation in groove 12 direction causes the sensing member 54 to rotate assembly 20 around the torch 10, and gear 40 drives gear 52 to change the position of the wipers in sine-cosine potentiometer 44. The sine portion of potentiometer 44 produces a signal that is indicative of the desired travel velocity of the torch in the Y direction and the cosine portion produces a signal indicative of the desired travel velocity in the X direction. These signals are supplied to the X, Y torch positioning controls in the existing welder control to establish a vector direction that is proper for the direction of groove 12.

Lever arm 30 has a sensing member 53 fixed thereto which slides over the surface of workpiece means 14 parallel to groove 12 during the weld operation, thus becoming an effective proximity probe or surface follower. Sensing member 53 has the same metallurgical properties as that previously indicated for the sensing member 54. In actual practice it may be welded to lever 30 or otherwise suitably attached. The upper end of lever 30 is in contact with the actuator of a proximity transducer 62 in the form of a linear potentiometer. Transducer 62 is mounted to mounting fixture 26. Any change in the surface configuration of workpiece means 14 will move sensing members 53, 54 generally upwardly or downwardly with respect to torch 10 and mounting fixture 26, causing levers 30, 32 to simultaneously pivot about shaft 34 to move the wiper of transducer 62. The output of transducer 62 is a signal indicative of actual vertical or Z position of torch 10 and is used in the welder controls to automatically maintain proximity.

Lever arm 32 carries the sensing member 54 in its lower extremity and a groove width transducer 64 at its upper extremity. Transducer 64 is also a linear potentiometer. Lever 30 is in contact with the actuator for transducer 64 and as long as the levers 30, 32 are stationary with respect to each other, its wiper does not move. However, if the width of the groove 12 changes, follower 54 will ride up or down relative to the surface plane of the workpiece means 14, because of the conical surface 58 in contact with the edge portions of the groove 12, and the transducer output will be changed. The signal from the groove width transducer 64 is related to depth of fill and may be used in the welder controls to make proper adjustment in either of two ways as will be seen in later descriptions in relation to FIGS. 3 and 4.

It will be noted by the mechanical arrangement of the orbital transducing assembly 20 and the various sensing members and transducers that change in direction of groove 12 always causes rotation of sine-cosine potentiometer 44 which leads to adjustment of torch velocity in the X and Y directions for a proper vector angle or direction. If the surface of workpiece means 14 undulates while width of groove 12 is constant, levers 30 and 32 will move together. This will change only the proximity transducer 62 since the groove width transducer 64 is mounted on lever 32. Any change in width of groove 12 causes conical surface 58 to move up or down, thereby causing a change in the relative positions of sensing members 53 and 54, in turn causing a change in the transducer 64 only. This arrangement permits a differential relationship between the elements for sensing proximity and groove width that is established through mechanical rather than electrical means.

Figure 2:
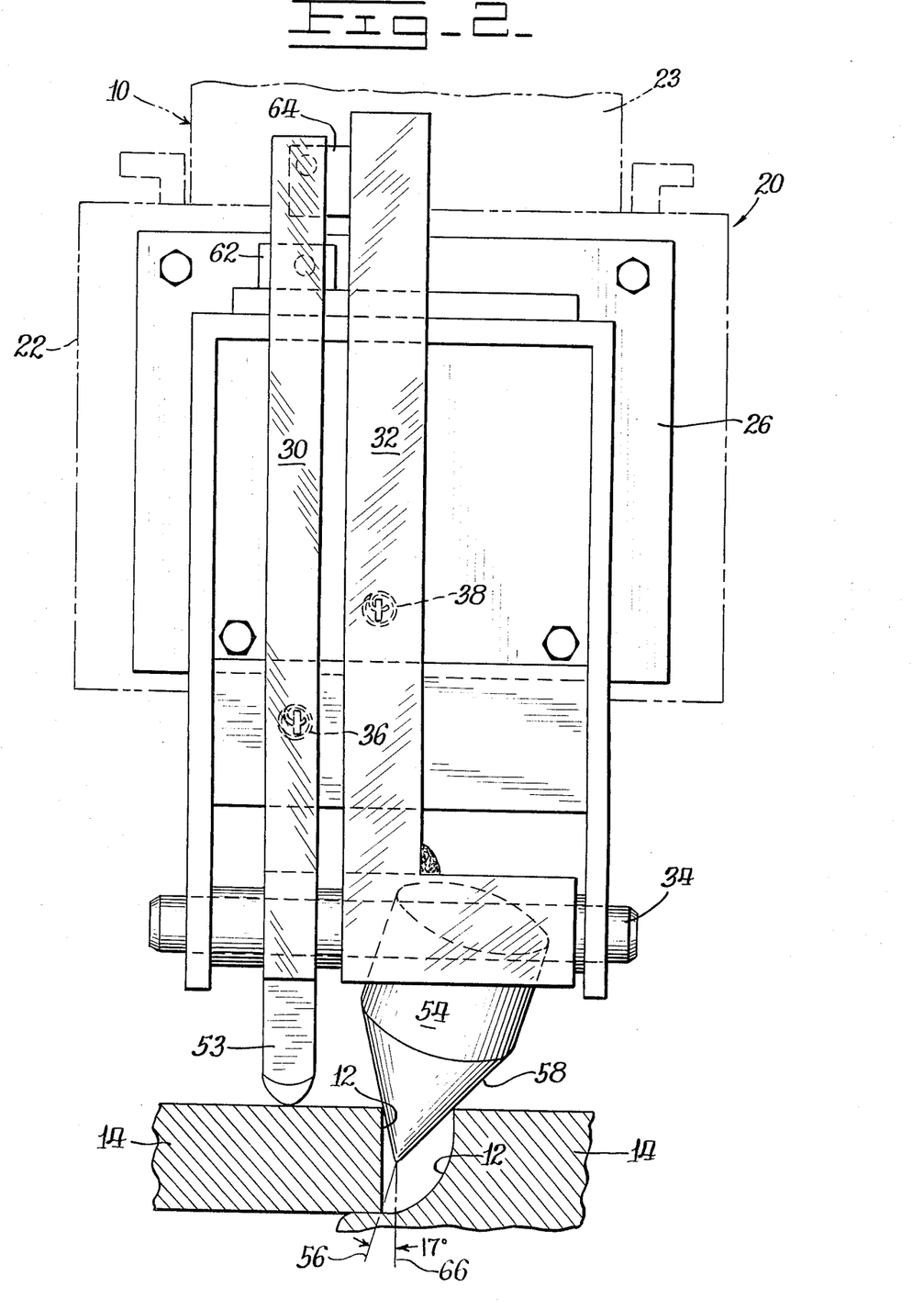
FIG. 2 is an elevational view taken along the line II—II of FIG. 1.

FIG. 2 is a frontal view of the orbital transducing assembly 20 taken along thee line II-II of FIG. 1. This view also shows the sensing member 54 with its center line 56 angled 17° with respect to the center line 66 of the electrode 18. This is in addition to the 30° tilt referred to in the description in relation to FIG. 1 for stabilizing the tracking characteristics. This 17° sideward tilt of the sensing member 54 has been found to be optimum for a particular set of conditions.

Figure 3:
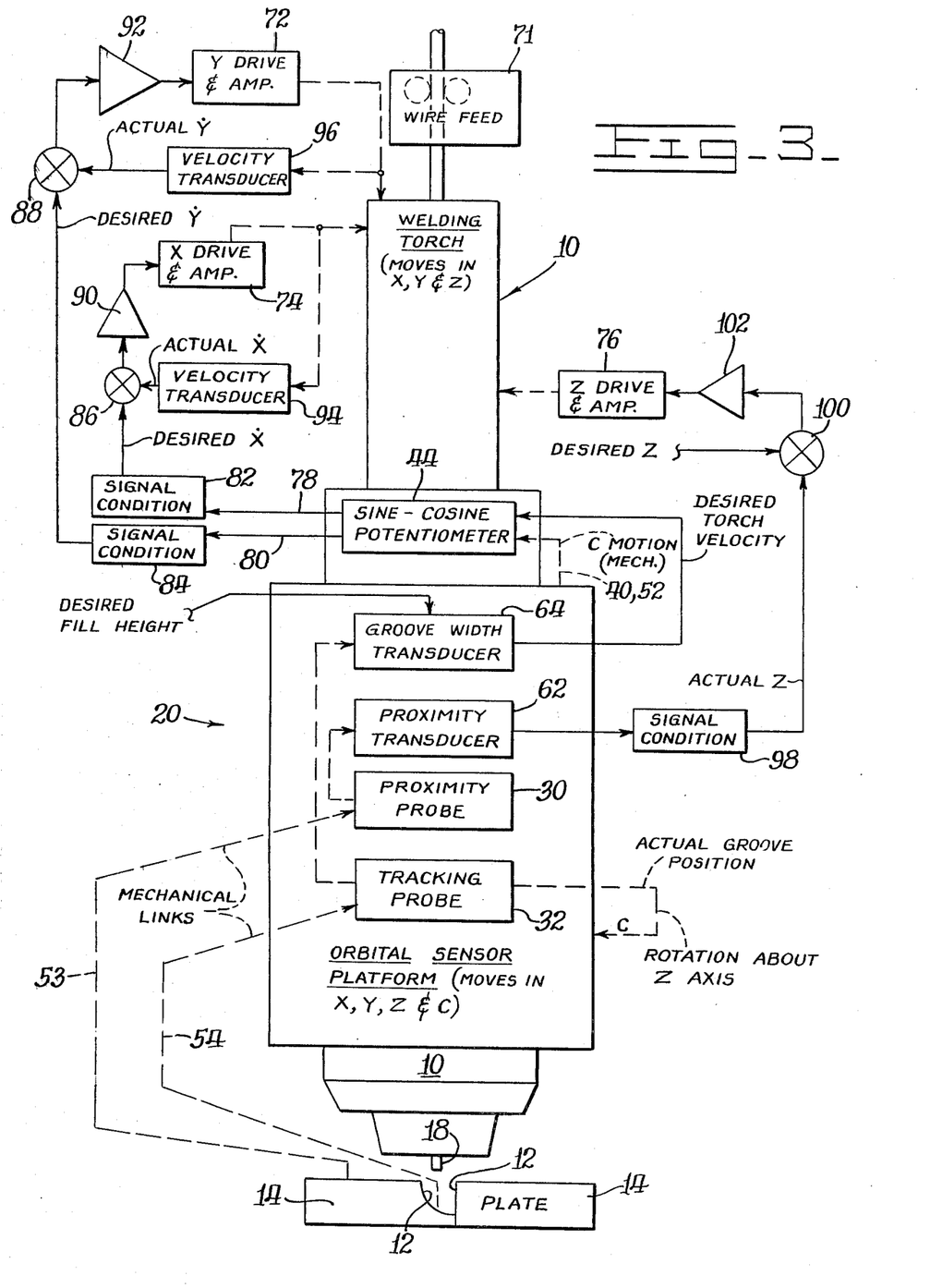
FIG. 3 is a block diagram representative of a control arrangement for the welding apparatus of FIGS. 1 and 2.

FIG. 3 shows the torch and orbital transducing assembly arranged in FIG. 1 in the environment of a block diagram control system for machine welders to demonstrate a control system where guidance, proximity and torch travel velocity are automatically controlled and feed rate of the electrode material 18 is manually set to a constant value. The torch 10 is movable in any variable path, i.e., along the X, Y and Z axes, and conventional means are included for so moving said torch 10. The electrode 18 of course travels with the torch 10.

A conventional wire feeder 71 is shown for moving electrode 18 through torch 10 to the workpiece 14. Feeder 71 is regulated by the machine welder controls (not shown) which set the wire feed rate and stabilize such rate once the apparatus is in operation.

Prior to start of a welding operation, manual adjustments would be made at the welder's control as follows:
i. set feed rate for wire feeder 71;
ii. set desired percent of fill at the groove width transducer electrical input;
iii. set proximity of torch to workpiece means at the desired Z input to the Z summing junction 100.

Control components which perform functions similar to elements 71, 72, 74, 76 shown in FIG. 3 in conventional machine welder controls are well known and will not be described in detail. The subject invention is a means to sense variables in welding parameters and produce signals indicative thereof to the conventional controls for automatically guiding and controlling the machine during the weld. This relieves the operator from such responsibility and removes guesswork from the weld operation while allowing high-quality weldments to be made.

The sensing member 54 moves generally along with mounting body 23, and leads electrode 18 down groove 12 as the weld progresses. A change in groove 12 direction causes member 54 to exert a turning force on the lever 32 to rotate assembly 20. Gear 40, therefore, rotates gear 52 (indicated by line designated 40, 52) to change the position of the sine-cosine potentiometer 44. Potentiometer 44 is serially connected with the groove width transducer 64 which does not change if groove width is constant. Under this condition, rotation of potentiometer 44 through rotation of the transducing assembly 20 causes a change in the signal on line 78 that is related to the desired X velocity and a signal on line 80 which is related to desired Y velocity. These signals are conditioned by signal conditioning circuits 82 and 84, respectively and fed to respective summing junctions 86, 88. The desired X velocity signal at junction 86 is fed through an amplifier 90 to alter the X drive and amplifier 74 and change torch velocity in the X direction. The desired Y velocity signal at junction 88 is fed through an amplifier 92 to simultaneously alter the Y drive and amplifier 72 and change torch velocity in the Y direction. As the X and Y drives are thus altered, actual X velocity information is fed back to junction 86 through a velocity transducer 94. Simultaneously, actual Y velocity information is supplied to junction 88 through a similar velocity transducer 96. When the desired velocity signals are equalled by corresponding actual velocity signals, the X and Y drives are stabilized and the torch 10 will have a vector direction that is proper for the direction of the groove 12. Thus, the sensing member 54 moves generally along and follows the groove 12 and the electrode 18 is movable generally along the groove 12 in response to the movement of the sensing member 54 along the groove 12, and weld material is deposited in the groove 12 in a continuous manner.

Signal conditioning circuits 82 and 84 compensate for the distance between follower 54 and electrode 18 (see FIG. 1) by delaying any change in electrode 18 position until the proper time.

With an unchanging direction and width of the weld groove 12, the velocity signals on lines 78 and 80 will be fixed. Groove width changes which would effect the fill height if vector velocity and wire feed rate remain constant are detected by sensing member 54 which will move up or down in groove 12, therby causing lever 32 to move the groove width transducer 64 with respect to lever 30. This will alter the circuit consisting of potentiometer 64 and sine-cosine potentiometer 44 to simultaneously change the velocity signals on lines 78, 80. This will cause the torch 10 to travel appropriately faster and slower to permit groove 12 to be filled to proper height while electrode 18 feed rate remains constant. That is, the speed of travel of the welding electrode 18 along the path of the groove 12 will be decreased in response to an increase in width of the groove 12, and the speed of travel of the welding electrode 18 along the path of the groove 12 will be increased in response to a decrease in the width of the groove 12.

Proximity control is accomplished by sensing workpiece means surface elevation through the sensing member 53 riding on the surface of the workpiece means 14 alongside the weld groove 12. Movement of the sensing member 53 moves proximity transducer 62 (through lever 30), whose signal is altered by a third signal conditioning circuit 98 and fed through a Z summing junction 100 and amplifier 102. The output of this amplifier 102 is supplied to Z drive and amplifier 76 to cause torch 10 to be raised or lowered. A desired Z positioning signal is supplied at the junction 100 through a preset adjustment at the existing welder control. When the two signals at junction 100 are matched, Z motion is discontinued.

The above-described system permits automatic guidance, proximity and groove fill control. The sensing member 54 causes all transducers to rotate about the axis of the electrode 18. Whenever the orbital transducing assembly 20 rotates, the sine-cosine potentiometer 44 also rotates. The electrical input to the sine-cosine potentiometer 44 comes from the groove width transducer 64 and is the calculated vector velocity of the torch 10 necessary to properly fill the groove 12. The electrical outputs of the sine-cosine potentiometer 44 are the X and Y velocities necessary to produce the calculated vector velocity.

Figure 4:
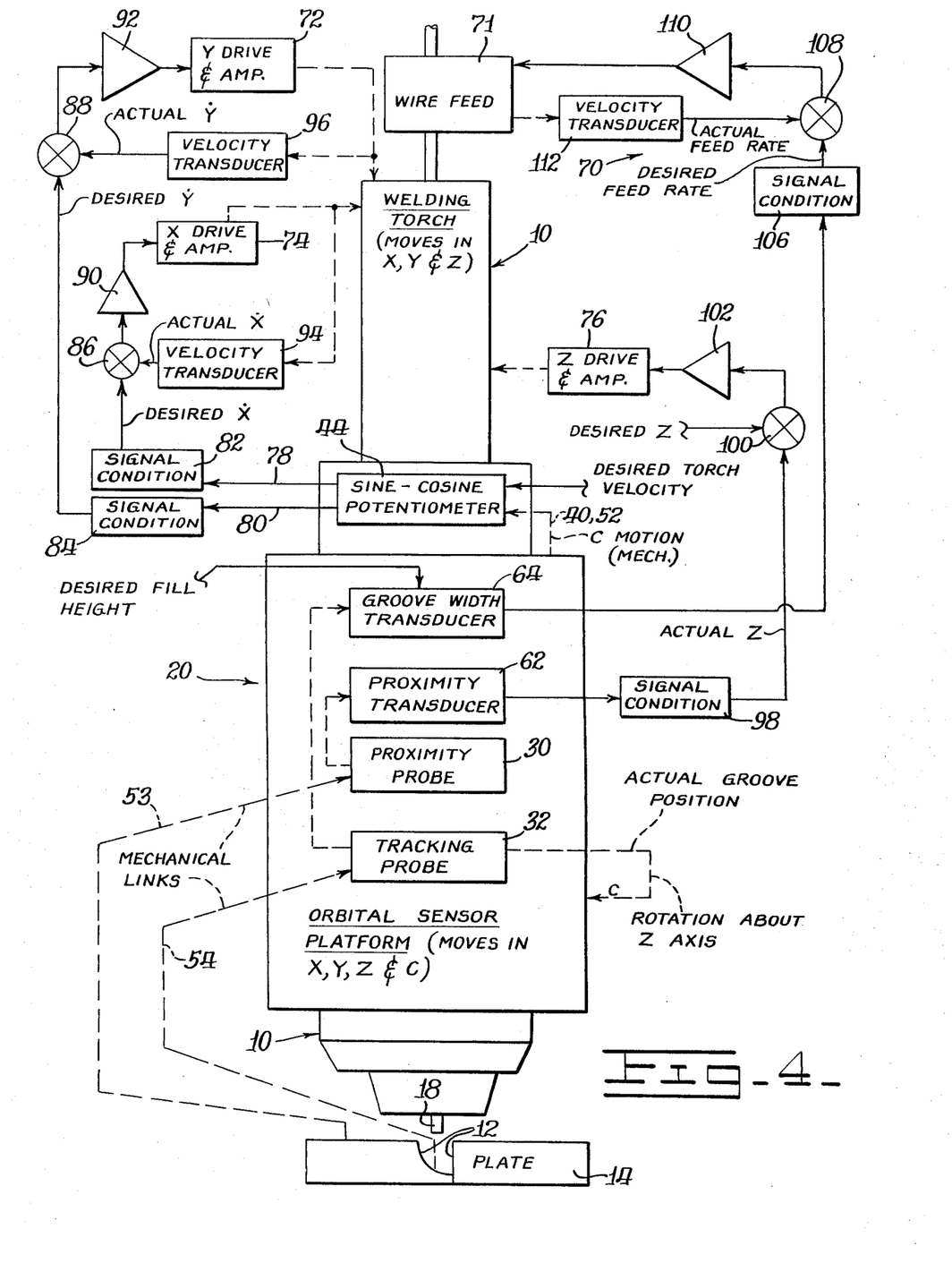
FIG. 4 is a block diagram representative of an alternate control arrangement used with the welding apparatus.

FIG. 4 shows an alternate system wherein the orbital transducing assembly is used in a control where vector velocity of the torch 10 is constant and weld groove fill height is controlled by varying electrode feed rate. Additional electrode feed control elements as indicated at 70 are incorporated with the conventional welder controls to permit this mode of fill control.

In this circuit, guidance or vector direction of the torch 10 is achieved identically to that described in relation to FIG. 3. The sine-cosine potentiometer 44 is energized from a potentiometer at the welder control which produces a desired torch velocity signal and has a mechanical input (gears 40, 52) for changing the signals on line 78, 80 to cause necessary changes in vector direction. Proximity control is also identical to that shown in FIG. 3.

Fill height is regulated by an additional closed loop 70 on velocity for electrode wire feed. The output of the groove width transducer 64 representing desired wire feed rate is fed to a signal conditioning circuit 106, of the same type and purpose as previously discussed, to a summing junction 108. The signal is then applied as input to an amplifier 110 whose output is used in the wire feeder 71 to cause desired variation of wire feed rate. Actual wire feed rate is fed back to junction 108 via a velocity transducer 112. When the signals from elements 106 and 112 to junction 108 are equal, amplifier 110 stabilizes and the wire feeder 71 maintains wire feed rate at the output of some definite value. Therefore, with the vector velocity of the torch 10 dependent only upon guidance information, weld groove fill control is achieved by varying the feed rate of electrode material 18. That is, the feed of electrode material 18 to the groove 12 is increased in response to an increase in width of the groove 12, and the feed of electrode material 18 to the groove 12 is decreased in response to a decrease in the width of the groove 12. In either embodiment shown in FIG. 3 or FIG. 4, if an increase in width of the groove 12 is sensed, the amount of weld material deposited in said groove 12 is increased. Conversely, if a decrease in width of the groove 12 is sensed, the amount of weld material deposited in the groove 12 is decreased.

Figure 5A:
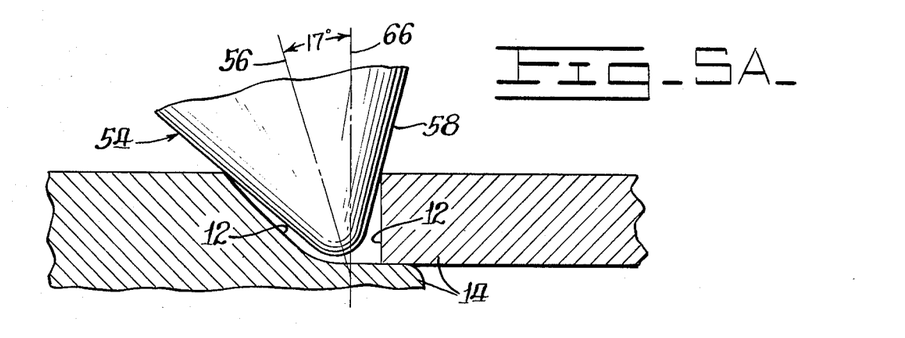
FIG. 5A is a cross-sectional view showing a sensing member extended portion in association with a narrow groove of substantially J-shaped cross-section.
Figure 5B:
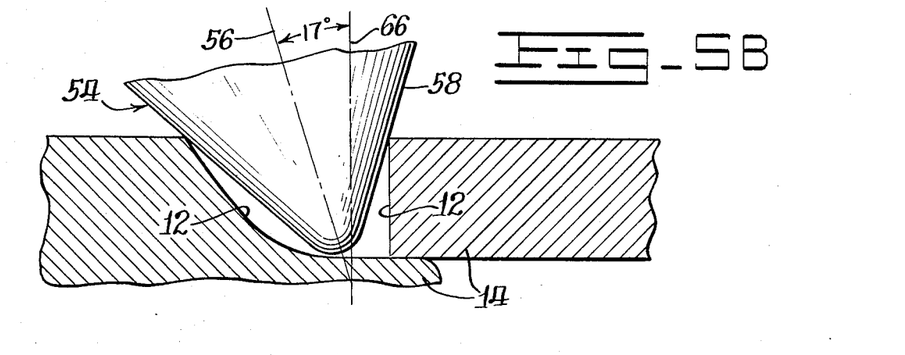
FIG. 5B is a view similar to that shown in FIG. 5A, but wherein the groove is of medium width and depth.
Figure 5C:
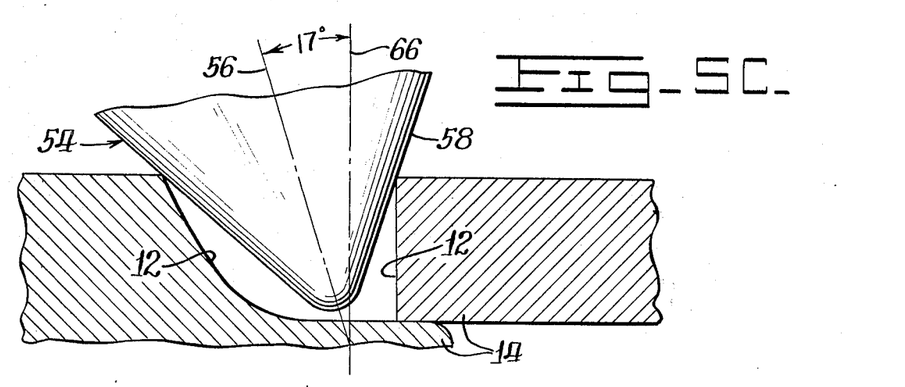
FIG. 5C is a view similar to that shown in FIGS. 5A and 5B, but wherein the groove is of relatively great width and depth.

FIGS. 5A, 5B and 5C demonstrate the advantage in tilting the central axis 56 of the conical portion 58 of the sensing member 54 laterally 17° with respect to the electrode centerline 66, which is substantially perpendicular to the plane of the workpiece means 14 adjacent the sensing members 53, 54. It will be noted that such central axis 56 and centerline 66 intersect at the root of the J-groove 12, where it is desirable that the weld be deposited, regardless of whether the groove 12 is narrow, medium or wide. Through such angling, the tip of the sensing member 54 (at the extended portion thereof) is properly positioned so as to position the electrode 18 relative to the groove 12 to achieve proper placement of weld material in and along the groove 12.

Figure 6:
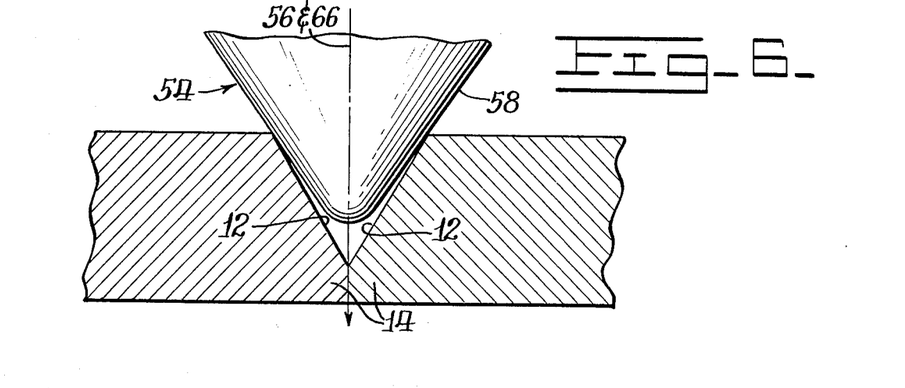
FIG. 6 shows the extended portion of the sensing member in the desired orientation for association with a groove of V-shaped or U-shaped cross-section.

In FIG. 6 the follower 54 is shown in a V-groove (or a U-shaped groove) and the sensing member and electrode centerlines 56, 66 are coincident to allow the weld to be deposited at the root of the groove 12. For such an application lever 32 (FIG. 1) would have to be changed to permit follower 54 to be installed with no side tilt. The 30° and 60° relationships shown in FIG. 1 would be retained to enhance tracking and permit groove width sensing.

The 17° tilt referred to above for sensing member 54 is selected to cause the welding arc to be struck at the root of the weld groove 12. This will also produce a nugget shape (weld cross-section) and strength at the weld area of particular characteristics. Changing this angle does not affect the ability to automatically control guidance, proximity and fill but it will alter the above-noted nugget shape and weld strength.

What is claimed is:

1. Apparatus for welding fixed workpiece means along a groove defined thereby comprising: a mounting body movable along any variable path; welding means connected to the mounting body and generally movable therewith; sensing means associated with the mounting body and generally movable therewith; the sensing means having a portion which may extend into and contact a portion of the groove; the welding means being positioned adjacent the sensing means and positionable adjacent the groove; means for providing movement of the mounting body in any direction to enable the mounting body to be moved thereby along any variable path; the sensing means, upon actuation of the means for providing movement of the mounting body, being movable generally along the groove; and means operatively connecting the sensing means and means for providing movement of the mounting body so that the welding means are movable generally along the groove in response to movement of the sensing means along the groove, so that weld material may be deposited in said groove in a continuous manner, and further comprising means associated with the sensing means for sensing the width of the groove as said sensing means follows the groove, and means operatively connecting the means associated with the sensing means and the welding means for increasing and decreasing the amount of weld material deposited in said groove, in proportion to the sensed increase and decrease in width of said groove, wherein the sensing means comprise a first sensing member having an extended portion thereof which may extend into and contact a portion of the groove, and a second sensing means positioned adjacent the first sensing member and having an extended portion thereof, which may contact the workpiece means adjacent said groove, wherein the welding means comprise an elongated welding electrode, and further comprising a support member pivotally associated with the mounting body so as to be pivotable relative thereto about the longitudinal axis of the welding electrode, and first and second lever arms pivotally fixed to the support member so as to be pivotable about a common axis transverse of the pivoting axis of the support member, the first and second sensing members being fixed to the first and second lever arms respectively.

2. The apparatus of claim 1 wherein the means associated with the sensing means for sensing the width of the groove comprise the extended portion of said first sensing member, said extended portion being inwardly tapered in the direction of the groove and having tapered surfaces in which may continuously contact the side edges of the groove, means for detecting differences in the movement of the first and second sensing members, the movement of the first sensing member being determined by the edge width of the groove, the movement of the second sensing member being determined by the configuration of the surface of the workpiece means adjacent said groove.

3. The apparatus of claim 2 wherein the means operatively connecting the means associated with the sensing means and the welding means for increasing and decreasing the amount of welded material deposited in said groove in proportion to the sensed increase and decrease in edge width of said groove, comprise means for increasing the feed of welding electrode to the groove in response to an increase in edge width thereof, and decreasing the feed of welding electrode to the groove in response to a decrease in edge width thereof.

4. The apparatus of claim 2 wherein the means operatively connecting the means associated with the sensing means and the welding means for increasing and decreasing the amount of welded material deposited in said groove in proportion to the sensed increase and decrease in edge width of said groove, comprise means for decreasing the speed of travel of the welding electrode along the path of the groove in response to an increase in edge width thereof, and increasing the speed of travel of the welding electrode along the path of the groove in response to a decrease in the edge width thereof.

5. The apparatus of claim 2 wherein each of the first and second sensing members comprise a tungsten carbide body and a titanium nitride coating thereon.

6. Apparatus for welding fixed workpiece means along a groove defined thereby comprising: a mounting body movable along any variable path; welding means connected to the mounting body and generally movable therewith; sensing means associated with the mounting body and generally movable therewith; the sensing means having a portion which may extend into and contact a portion of the groove; the welding means being positioned adjacent the sensing means and positionable adjacent the groove; means for providing movement of the mounting body in any direction to enable the mounting body to be moved thereby along any variable path; the sensing means, upon actuation of the means for providing movement of the mounting body, being movable generally along the groove; and means operatively connecting the sensing means and means for providing movement of the mounting body so that the welding means are movable generally along the groove in response to the movement of the sensing means along the groove, so that weld material may be deposited in said groove in a continuous manner, and further comprising means associated with the sensing means for sensing the width of the groove as said sensing means follows the groove, and means operatively connecting the means associated with the sensing means and the welding means for increasing and decreasing the amount of weld material deposited in said groove, in proportion to the sensed increase and decrease in width of said groove, wherein the sensing means comprise a first sensing member having an extended portion thereof which may extend into and contact a portion of the groove, and a second sensing means positioned adjacent the first sensing member and having an extended portion thereof, which may contact the workpiece means adjacent said groove, wherein each of the first and second sensing members comprise a tungsten-carbide body and a titanium-nitride coating thereon.

7. Apparatus for welding a groove defined by a workpiece means, said apparatus having welding means and a sensing member adjacent said welding means for movement along said groove, the movement and positioning of the welding means being responsive to movement of the sensing member along the groove, wherein the sensing member is provided as having a tungsten carbide body and a titanium nitride coating thereon.

* * * * *

UNITED STATES PATENT OFFICE
CERTIFICATE OF CORRECTION

Patent No. 3,924,094     Dated December 2, 1975

Inventor(s) John W. Crayton et al

It is certified that error appears in the above-identified patent and that said Letters Patent are hereby corrected as shown below:

On the cover page (top left) should read CRAYTON ET AL

On the cover page, line 75, after "Inventors:", the information should read --John W. Crayton, Washington, Howard A. Hansen, Mossville, both of Ill.; Clyde E. Fulton, deceased, late of Tazewell, Ill.; by Minnie L. Fulton, heir, Tazewell, Ill.; by Brenda G. McCann, heir, Boise, Idaho--

On the cover page, line 73, the information should read -- Assignee: Caterpillar Tractor Co., Peoria, Ill.--

Signed and Sealed this twenty-seventh Day of April 1976

[SEAL]

Attest:

RUTH C. MASON
*Attesting Officer*

C. MARSHALL DANN
*Commissioner of Patents and Trademarks*